July 6, 1965  E. BETZ  3,193,097
APPARATUS FOR STRAINING SUSPENSIONS OF SOLID PARTICLES
Filed March 13, 1961  2 Sheets-Sheet 1

INVENTOR
ERICH BETZ
BY
Jacob L. Kollin
ATTORNEY

INVENTOR
ERICH BETZ
by Jacob G. Kollin
ATTORNEY

United States Patent Office 3,193,097
Patented July 6, 1965

3,193,097
APPARATUS FOR STRAINING SUSPENSIONS OF SOLID PARTICLES
Erich Betz, Worms (Rhine), Germany, assignor to Chr. Wandel K.G., Reutlingen, Wurttemberg, Germany
Filed Mar. 13, 1961, Ser. No. 95,373
Claims priority, application Germany, Mar. 19, 1960, W 27,486; Dec. 6, 1960, W 29,042; Jan. 31, 1961, W 29,364, W 29,365
5 Claims. (Cl. 209—287)

The present invention relates to an apparatus, also called a pulp strainer, for straining suspensions of solid particles, especially of fibrous materials for the production of paper, by means of a rotatable drum-shaped strainer which is mounted on a container between the inlet and outlet openings thereof and is adapted to be subjected to vibrations by means of an oscillator, and which is provided with hollow shafts which are laterally mounted thereon and one of which serves as the outlet for the strained suspension.

A pulp strainer of the above-mentioned kind is used for grading, separating or cleaning suspensions of fibrous materials, and in this operation the passage of the suspension through the strainer is aided by vibrating the latter.

It is an object of the invention to mount each hollow shaft of the strainer so as to be capable of vibrating by means of at least one intermediate element which is substantially uniformly resilient at least in radial directions. This element resiliently supports the strainer and opposes its movement in any direction relative to the stationary axis of the apparatus by a force of an equal strength. By making this resilient element an annular shape, it is possible more easily than in any other manner to vibrate the strainer as closely as possible in accordance with the desired circular direction. In place of an annular element, it is, however, also possible to apply several resilient elements which are designed similar to buffers.

The use of an annular resilient element results in a very simple and compact apparatus which has only a few components, may be inexpensively manufactured, easily serviced and maintained in proper operation, and in which the parts to be serviced are easily accessible.

The resilient element may be provided in the form of a pneumatic spring in which the internal pressure may be varied to permit the natural frequency of the vibrating parts also to be varied in a very simple manner, or the resilient element may be filled with a fluid.

The resilient element may also be designed in the form of a bearing element for the hollow shaft, for example, as a bushing, or the like. Since the lubricant which is provided between the resilient element and the hollow shaft also serves as a resilient cushion, it is advisable to arrange the resilient element and the lubricant cushion directly behind each other so that they will not be separated by a rigid intermediate element. If such a resilient bearing-like element is given adequate bearing clearance, it may also be in the form of a solid body.

The degree of resilience of the lubricant cushion may be varied by supplying the space formed by the resilient element and the hollow shaft with a lubricant under a pressure which may be adjusted as desired. The lubricant may then be subjected to the pressure of a pressure reservoir so as to permit the lubricant to yield, or one of the bearing gaskets may be designed so as to seal the bearing clearance only up to a certain pressure of the lubricant and to permit the lubricant to escape if this pressure is being exceeded.

One important advantage which is attained by the invention is the fact that the vibration-producing elements are designed so as to engage directly upon the bearing of the drum so that no transmitting elements are required and practically no vibrations will be dissipated. Furthermore, the oscillators which are mounted on the outside of the bearing housing are easily accessible.

A very simple oscillator according to the invention consists of an armature and an electromagnet containing a solenoid in which one of the parts, either the armature or the solenoid, is connected to the container and the other part to the strainer, while both parts are spaced from each other at a distance which is at least equal to the maximum amplitude of the vibrations.

In order to transmit an elliptical vibration to the strainer which is as similar to and as effective as possible as a circular vibration, the invention provides at least two oscillators the effective directions of which are disposed at an angle to each other. If the oscillators are provided in the form of electromagnets, it is possible by means of an alternating current of a varying frequency and/or of a varying strength to vary the size of the amplitude during the operation of the apparatus. The plates of the armature and/or of the coils may be made of an annular shape.

Depending upon the purpose to be attained, any number $n$ of electromagnets greater than two may be provided, the magnetic axes of which are offset relative to each other at an angle of $360°/n$. By changing the frequency or by a partial rectification and by changing the voltage of the current supplied to one or all of the electromagnets, it is possible to attain the desired movements of the strainer. If a three-phase current is available, it is possible to produce a rotary field by displacing the magnetic axes of the electromagnets relative to each other at an angle of $120°$ and by passing the current through the solenoids.

The strainer may be operated under pressure in a closed housing. In such case the unstrained suspension of fibrous materials which may surround the strainer almost along its entire periphery and is placed under a pressure higher than atmospheric, and it flows from the inlet in the peripheral direction of the strainer toward a waste outlet, and during this flow the waste material which does not pass through the strainer is accumulated and passed to the waste outlet. The increased pressure in the suspension may be produced by keeping the container closed and feeding the unstrained suspension into it under pressure or by using an open, relatively high container in which the pressure which is to be active on the strainer is built up by the fiber suspension standing above the strainer. If the strainer is immersed completely in the fiber suspension a greater rate of flow of material through the strainer will be attained than if only one-half of the strainer is immersed as it is done conventionally.

In order to attain a strained materials of a high quality it is of importance that, if the apparatus operates under an increased pressure, the direction of the flow of material will not be suddenly or radically changed, since the flow might thereby be dammed up which would prevent a uniform pressure gradient between the unstrained and the strained material and result in pressure differences in the fiber suspension along the periphery of the drum which, in turn, might lead to a different separating characteristic and also to a clogging of the strainer by small particles which cannot penetrate through the strainer apertures, and it may also lead to a change in consistency and especially to a thickening of the fiber suspension. By passing the fiber suspension during the straining process in the peripheral direction of the strainer, such undesirable changes in the direction of flow will be fully avoided. The suspension while being enriched in waste products may pass freely from the inlet to the waste outlet along almost the entire periphery of the strainer. It is, however, also possible to provide several suspension currents separate from each other along the periphery of the strainer and to pass each of them only along a part of the periphery of the strainer.

At the waste outlet, a valve element may be provided for opening and closing the outlet and at a point previous thereto a scraper may also be provided which is adapted to clean the smooth peripheral surface of the strainer and to follow the vibrating movements of the strainer at least at its points of engagement with the strainer. For the latter purpose, the part of the scraper adjacent to the strainer is either made resilient or the entire scraper is movably mounted so as to follow the vibrations of the strainer.

The effect of the scraper may be considerably increased either by providing the inside of the scraper with a chamber which is limited at one side by the strainer, or by providing a bucket wheel with a compartment and by keeping the chamber or compartment under a lower pressure than the sifted fiber suspension contained in the strainer. This chamber or compartment may be kept under the pressure of the atmosphere since the bearing of the strainer is kept under a higher pressure. The chamber or compartment may also be connected to a source of pressure below atmospheric so as to exert a suction effect upon the strainer.

The above-mentioned as well as additional objects, features, and advantages of the invention will become more clearly apparent from the following detailed description thereof, particularly when the same is read with reference to the accompanying drawings, in which.

Figure 1:
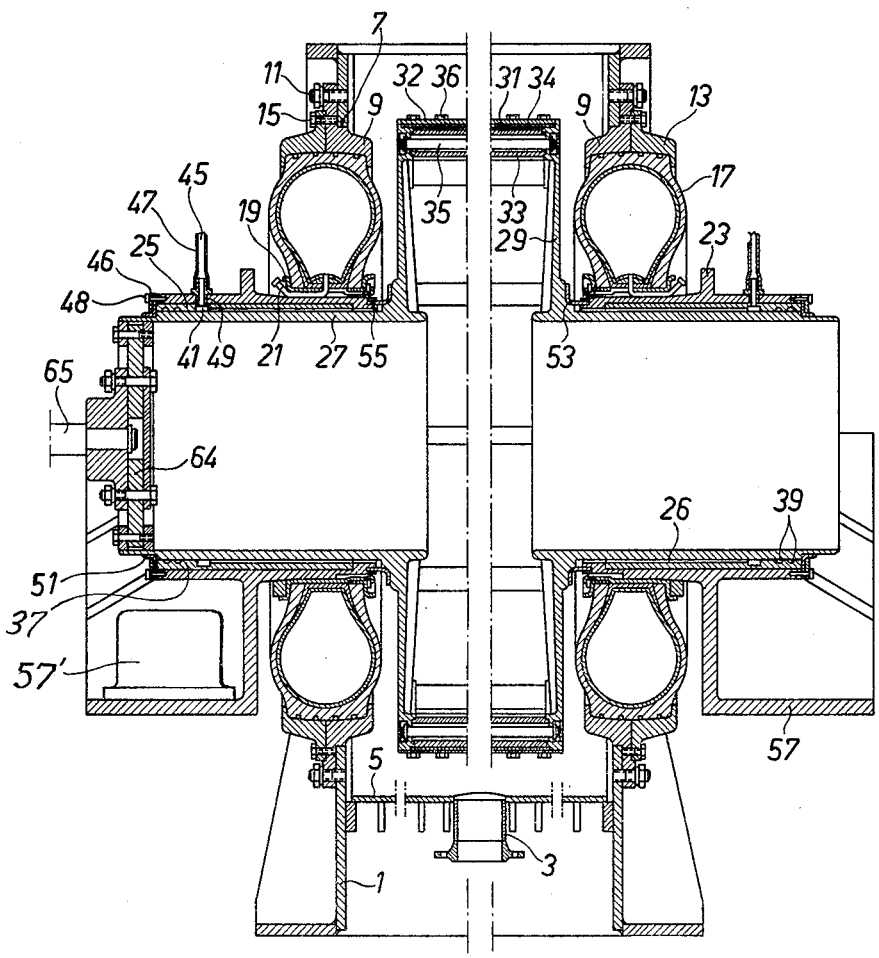
FIGURE 1 shows a longitudinal section of one embodiment of the apparatus according to the invention.

Referring first to FIGURE 1 of the drawings, a container 1 comprises a pair of opposite side walls, and an outlet 3 in its bottom 5 and an aperture 7 in each side wall. Each of these apertures 7 contains an annular supporting member 9 which is secured to the respective side wall of the container by means of bolts 11. A complementary supporting member 13 is secured to member 9 by bolts 15, and both supporting members 9 and 13 together surround the tread surface of a pneumatic automobile tire 17 which is mounted on a wheel rim 19 through which a tube 21 passes at one side of the tire to a valve, not shown. Rim 19 is secured to a bearing housing 23 in which a bushing 25 is mounted which is provided with longitudinal grooves 26.

Bushing 25 has rotatably mounted therein a hollow shaft 27 which has an annular flange 29 thereon which is disposed at the inside of container 1 and has a cylindrical strainer 31 secured to the peripheral surface of flange 29 and to the corresponding flange at the right side thereof, not shown. Flanges 29 are additionally connected to each other by spacing tubes 33 and connecting bolts 35 therein.

Strainer 31 consists of a plurality of slotted sheet-metal sections which are connected to each other and secured to the peripheral surface of flanges 29 and are also secured to spacing tubes 33 by means of covering strips 32, spacing strips 34, and screws 36. Vibration-damping inserts may also be placed between the slotted strainer plates at one side and the peripheral surfaces of flanges 29 and the spacing strips 34 at the other side.

The outer part 37 of each bushing 25 has a pair of annular inner grooves 39 which serve as sealing channels. If necessary, a gasket may be inserted into each of these grooves. At the beginning of the longitudinal grooves 26, bushing 25 further has an annular groove 41 into which an inlet channel 45 terminates which extends through housing 23 and consists of a tube 47 which is secured to housing 23 by means of a connecting nipple 49.

The outer end of housing 23 carries a flanged annular gasket 51 which is secured to the housing by means of a cover ring 46 and screws 48. One web of gasket 51 extends along the end wall of housing 23, while the other web extending at a right angle thereto is disposed within a recess in the outer surface of the hollow shaft 27. A second annular gasket 53 is secured to the inner end of housing 23 by means of a spring ring 55. This gasket is likewise angular and the flange thereof engages in a corresponding portion in flange 29.

Housing 23 has a leverlike extension 57 thereon on which a pair of electromagnetic oscillators 57' are secured at a certain angle to each other, preferably at an angle of 90° or 120°, the apex of which lies within the axis of shaft 27. These oscillators are designed so as to permit the amplitude thereof to be varied during the operation of the apparatus. In place of electromagnetic oscillators it is also possible to provide oscillators which are driven mechanically, hydraulically, or in any other suitable manner.

Into the end of hollow shaft 27 a resilient ring 64 is inserted which is firmly secured near its outer edge to shaft 27 and carries on its central part a drive shaft 65 for the strainer 31. While the hollow shafts at both sides of the apparatus are mounted in similar bearings, as above described, the hollow shaft at the right side is open at its outer end to serve as an outlet for the strained suspension.

In the operation of the apparatus, as illustrated in FIGURE 1, a suspension of fibrous materials is continuously filled into container 1 and then passes through strainer 31 and through the hollow shaft at the right side and is discharged from the apparatus through the opening at the outer end of the right hollow shaft. Strainer 31 holds back the so-called knots in the fiber suspension which are then discharged through a waste outlet, not shown, while the heavy particles which accumulate on the bottom 5 of container 1 are discharged from time to time through outlet 3. It is advisable to brush off the strainer from time to time along the outside which may be done by means of a revolving brush, not shown.

Strainer 31 and hollow shafts 27 which are connected thereto are driven through shaft 65 by a motor, not shown. For lubricating the bearings of shafts 27, water is used which is supplied to bushings 25 through channels 45 and then flows to the inside of container 1 through groove 26 and a gap between housing 23 and hollow shaft 27, and past the gasket 53 which is lifted off the flanged part 29 of shaft 27 by the pressure of the water current. The water then passes along the side wall of tire 17 at the inside of container 1 and thereby cools the latter. The water is then mixed with the suspension in container 1.

The oscillators are designed, arranged, and driven in a manner so as to produce a vibration of strainer 31 which is as circular as possible. If more than one oscillator is provided on each side of the container they may be tuned to each other. It is also possible to provide a resilient element and an oscillator which acts upon shaft 27, and to design them in such a manner that strainer 31 will be vibrated almost with a circular motion.

Figure 2:
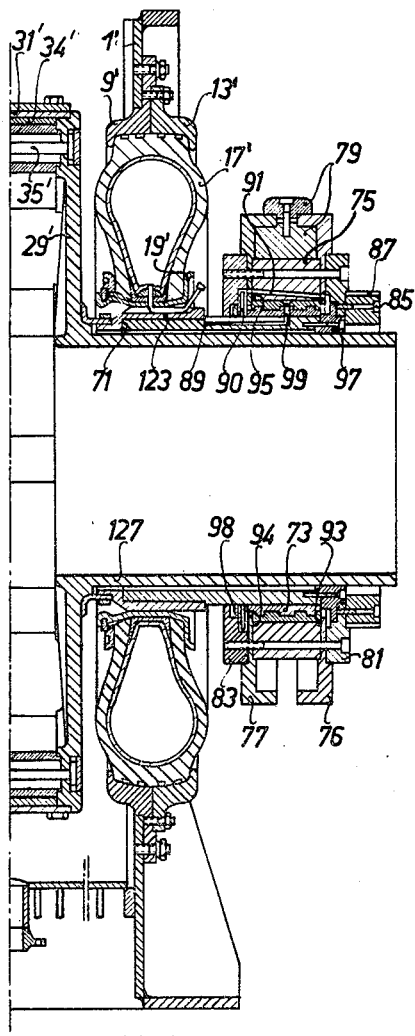
FIGURE 2 shows a similar view of a part of a modification of the apparatus.

FIGURE 2 illustrates a modification of the bearings of the hollow shafts 127 of which again only one is shown. Those parts in FIGURE 2 which are similar to those in FIGURE 1 are indicated by the same reference numerals to which an apostrophe is added. A bearing housing 123 has a sleeve 71 inserted therein which carries a bushing 73 for a ring 75 which is held by flanges 76 and 77 on bushing 73. Flanges 76 and 77 have one or more eccentric weights 79 secured thereto. Ring 75 has a gear rim 87 secured thereto by means of a pair of flanges 81 and 83 and screws 85. This gear rim 87 serves for driving the parts 75 to 77, 79, 81 and 83 on bushing 73 by means of a gear chain or a gear belt, not shown, which drives the mentioned parts at a speed different from the speed at which hollow shaft 127 is driven by drive shaft 65.

A recess in sleeve 71 contains a tube 89 which is connected to a channel 99 which extends to the center of bushing 73. Sleeve 71 has a plurality of blades 90 secured thereto which project into a recess between parts 77 and 83. Parts 75 to 77 have a channel 91 therein which ascends toward one side and communicates with bushing 73 through annular grooves 93 and 94 and radial bores 95. For sealing the bushing toward the outside, a pair of rings are provided, each of which has an annular bladelike edge 97 and 98 thereon. Ring 97 is secured to sleeve 71, clamps bushing 73, and projects with its edge into a step-shaped annular groove in flange 83.

If a lubricant is fed from the outside through tube 89 and channel 99, it flows during the rotation of parts 75 to 77, 79, 81 and 83 toward both sides of bushing 73, and then, due to the centrifugal force, it is forced into the annular grooves 93 and 94 and bores 95 and then through the ascending channel 91 to the stationary blades 90 from which it is returned through a channel, not shown, which corresponds to channel 99, to the center of bushing 73.

The waste material may, however, also be discharged either periodically or continuously by means of a slide valve or a screw conveyor.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An apparatus for straining suspensions of solid particles, comprising a container having side walls and a bottom and an inlet for the unstrained suspension and a waste outlet for the unstrainable suspension, a rotary drum strainer rotatably mounted within said container, each of said side walls of said container having an opening, a pair of hollow shafts secured to the opposite sides of said strainer and projecting laterally therefrom and through said openings, the inside of said shafts communicating with the inside of said strainer, one of said shafts having an open outer end serving as an outlet for the strained suspension, annular pneumatic tube means disposed in each of said openings, each of said pneumatic means surrounding one of said shafts and resiliently supporting one of said shafts, means secured to each of said side walls adjacent said openings and secured to said pneumatic means for supporting said pneumatic means in said openings, each of said opening containing a bearing means intermediate its respective pneumatic means and shaft for rotatably supporting said shafts and strainer, means associated with one of said shafts for vibrating said strainer and means for rotating said drum strainer.

2. Apparatus according to claim 1, wherein the vibrating means comprise at least a pair of electromagnets associated with one of said shafts for vibrating said strainer.

3. Apparatus according to claim 1, wherein the vibrating means comprises an eccentric weight connected to one of said shafts.

4. Apparatus according to claim 1, wherein said means securing said pneumatic means comprises two annular means surrounding the edges of said pneumatic means, said annular means being secured to said side walls by bolt means.

5. Apparatus according to claim 1, in which said bearing means comprise a bushing for each of said shafts, means for supplying a lubricant under pressure to said bushings and gaskets for sealing said bearing means at both ends thereof.

References Cited by the Examiner

UNITED STATES PATENTS

| | | | |
|---|---|---|---|
| 1,918,456 | 7/33 | Dodge | 210—388 X |
| 2,653,521 | 9/53 | Ahlfors | 210—384 X |
| 2,669,909 | 2/54 | Gibson | 210—402 X |
| 3,027,011 | 3/62 | Flynn | 210—404 |

FOREIGN PATENTS 580,146   7/59   Canada.

REUBEN FRIEDMAN, *Primary Examiner.*

GEORGE D. MITCHELL, HERBERT L. MARTIN,
*Examiners.*